Nov. 24, 1942.   J. A. BUCHANAN   2,302,670
ACCELEROMETER
Filed Oct. 14, 1941
Fig. 1.
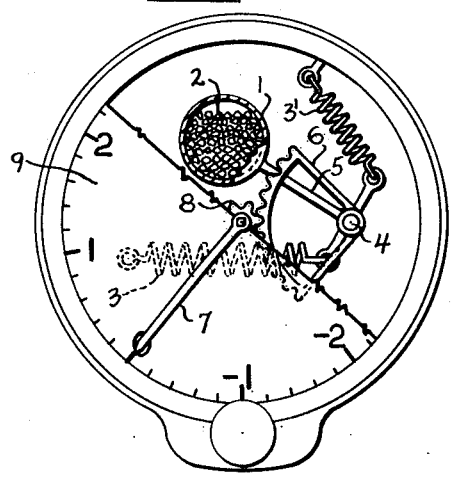
Fig. 2.   Fig. 3.   Fig. 4.
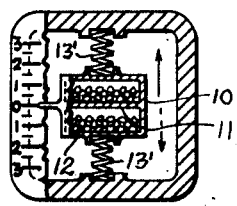 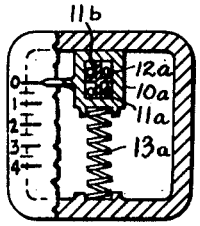 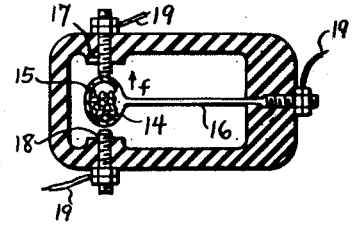
Fig. 5.   Fig. 6.
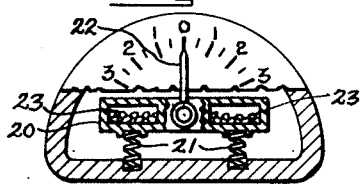 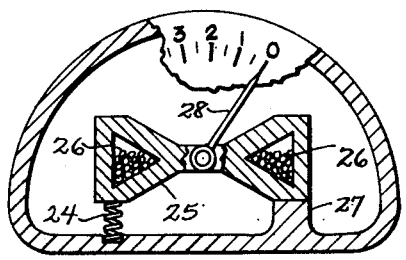
Fig. 7.
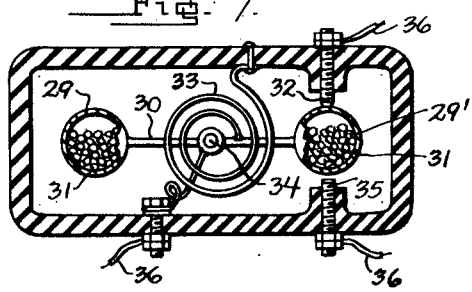
INVENTOR
James A. Buchanan
BY
ATTORNEY Patented Nov. 24, 1942

2,302,670

UNITED STATES PATENT OFFICE 2,302,670

ACCELEROMETER

James A. Buchanan, United States Navy

Application October 14, 1941, Serial No. 414,932

6 Claims. (Cl. 264—1)

(Granted under the act of March 3, 1883, as amended April 30, 1928; 370 O. G. 757)

My invention relates to instruments for measuring the accelerations attained by moving objects such, for example, as aircraft. These instruments are commonly known in the art as accelerometers. My invention applies alike to displacement and classifying accelerometers, either of which comprises an acceleration-sensitive mass or weight and a restraining force.

The art of accelerometry is complicated by the fact that basic or first order accelerations are frequently accompanied by secondary or higher order accelerations superimposed upon the basic phenomenon. These parasitic vibrations may cause disturbances in the movement of the acceleration-sensitive element of such magnitude and characteristics that the response of such sensitive element to the basic acceleration is at times determinable with difficulty or even obscured completely. In classifying accelerometers, the influence of parasitic vibrations may be overcome to a considerable extent by the expedient of providing a small gap which the element must traverse before attaining an indicating or recording position. In displacement accelerometers, the influence of parasitic vibrations has been offset by the provision of damping means externally applied to the acceleration responsive system. In the latter type of instrument, however, the introduction of damping gives rise to further complications, since it is also necessary to give particular consideration to the effects of rate of change in acceleration on the sensitive system of displacement accelerometers.

It is, of course, well-known practice to construct the acceleration-sensitive mass of accelerometers in the form of a solid body. It is also well-known that damping has sometimes been necessary, and when damping has been deliberately introduced, the previous art teaches that it has been externally applied to the sensitive mass by one of the following methods:

(1) Externally applied friction in which a fixed friction member makes frictional contact with the movable acceleration responsive mass.

(2) Air damping in which the acceleration responsive mass or a member movable therewith operates in an air chamber.

(3) Viscous damping in which the acceleration responsive element or a member movable therewith is restrained by the viscous flow of a fluid, or (4) Magnetic or induction damping in which the acceleration responsive mass is subjected to the influence of a magnetic field which thereby serves to restrain its movement.

Each of the above recited methods of damping has its disadvantages. In the case of friction damping, it is difficult to maintain constant and permanent the friction which is applied, since constant rubbing between the movable mass and the friction member will obviously cause wear, the effect of which will be to vary the applied friction. Furthermore, such friction will be affected by the introduction of foreign matter such as dirt or oil between the friction member and the mass and it may also change somewhat with variations in relative humidity.

In the case of air damping, the damping effect is, of course, dependent upon orifice conditions or upon the air gap between the movable member and the walls of the chamber in which it resides. When accelerometers are installed on aircraft, they are subjected to extreme differentials in temperature, such as the very low temperatures prevailing at high altitudes and the relatively high temperatures attained near the earth's surface, and the respective contraction and expansion of the mass and chamber walls makes it difficult to maintain the air gap therebetween, and therefore the amount of damping, at any constant value.

Viscous damping is dependent upon the kinematic viscosity of liquids, the design of the moving parts and the chambers containing liquid, and the characteristics of the relative motions involved. Since viscosity varies with temperature, the damping action is subject to corresponding variation unless means are introduced to maintain constant temperatures. Variations may also be introduced due to losses of liquid and, when sealed chambers are used, it is necessary to provide for expansion of the liquid.

In the case of magnetic or induction damping, which depends upon the strength of a magnetic field for its effectiveness, errors may be introduced because of stray electric or magnetic fields which are often encountered. Also the strength of the damping field will vary somewhat with temperature and aging.

I have found that permanent and constant damping characteristics can be imparted to accelerometers by causing the damping means to move in its entirety with the acceleration-sensitive mass. Instead of the usual solid mass in the acceleration-responsive element I provide, in my preferred embodiment, a hollow member wherein are sealed a plurality of mass particles freely movable within the confines of the hollow member. I further prefer to use as such unattached mass particles dry, dense material having a high angle of repose.

It is therefore a broad object of my invention to provide an acceleration responsive element for an accelerometer which is self-damping and which has permanent and constant damping characteristics.

A specific object of my invention is to provide an acceleration responsive member which comprises a shell containing an unattached mass free to move within the confines of said shell to develop internal damping.

Another specific object is to provide a self-damping acceleration responsive member comprising a hollow body into which is placed a plurality of loose granulated particles to develop internal damping.

Another specific object is to provide a self-damping acceleration responsive member which comprises a shell containing unattached, dense metal.

A more specific object of my invention is to provide a self-damping acceleration responsive member comprising a multi-compartment shell, each said compartment containing an unattached mass which, through free movement therein, develops internal damping.

These and other objects of my invention will become more apparent from the detailed description to follow and from the accompanying drawing in which:

Fig. 1 is a side elevation, partly in section illustrating my invention as applied to one form of a linear displacement type accelerometer.

Fig. 2 is a side elevation partly in section illustrating my invention as applied to another form of linear displacement accelerometer which is applicable for use in measuring acceleration either in the direction of the solid arrow or of the broken arrow.

Fig. 3 is another form of a displacement accelerometer which is applicable for measuring linear accelerations in only one direction.

Fig. 4 illustrates the use of my invention as applied to a classifying type of accelerometer for measuring linear accelerations, the principles of operation of which are fully described and claimed in my co-pending application Serial No. 413,476, filed October 3, 1941.

Figs. 5 and 6 illustrate my invention as applied to displacement type accelerometers for measuring angular acceleration, and Fig. 7 illustrates my invention as applied to a classifying type of accelerometer for measuring angular accelerations, the operating principles of which constitute the subject matter and claims of my co-pending patent application, Serial No. 417,571, filed November 1, 1941.

Referring now in particular to Fig. 1, the acceleration responsive mass comprises a shell 1 into which is placed loose mass particles 2 in order to obtain a damping effect by virtue of the internal friction developed by movement of the loose particles which respond as a whole to basic forcing accelerations having a relatively low order of frequency but which move with respect to one another in response to accelerations of relatively high orders of frequency. I prefer to use loose mass particles consisting of a dry finely powdered metal of high density, such as tungsten.

The shape and relative size of the shell 1 and the degree to which it is filled with the mass particles 2 may be adjusted to the particular needs of the accelerometer and to the service conditions which must be met. Likewise, the physical characteristics of the individual mass particles, such as size, shape, density, and hardness, will depend upon the design of the instrument and the type of service in which it will be applied. In general, for a given size and shape of cavity, given physical characteristics of the loose mass particles and a given degree with which such loose particles fill the cavity, the greater the percentage of total effective mass at the center of gravity of the acceleration responsive member which is represented by the loosely confined material, the greater will be the tendency of the acceleration responsive member towards aperiodicity when acting in conjunction with springs 3 and 3' or any other suitable type of force producing means comprising the force-mass system of the accelerometer.

The instrument illustrated in Fig. 1 operates in the following manner: If the body to which the accelerometer is attached undergoes an upward acceleration, sensitive member 1, which is normally maintained in the neutral position shown by means of spring members 3 and 3', undergoes a relatively downward (i. e., with respect to the accelerometer case or frame) acceleration, causing it to rotate in a counterclockwise direction about pivot 4. An arm 5 connecting member 1 with the pivot 4 is fixed with respect to gear segment 6. Accordingly, as member 1 and its associated arm 5 move in a counterclockwise direction, pointer 7, which is fixed with respect to pinion gear 8, will rotate in clockwise direction. The degree of such rotation will be dependent upon the forcing acceleration imparted to member 1. Scale 9, which is traversed by pointer 7, may be graduated to any desired acceleration scale, the particular graduations illustrated being in steps of 1 g.

The damping action is illustrated as follows: Suppose the forcing acceleration applied to an accelerometer were actually the resultant of two acceleration conditions, a basic acceleration in a steady state or of relatively low frequency with respect to the natural period of vibration of the spring-weight combination of the accelerometer, and a superimposed secondary acceleration of relatively high frequency with respect to the natural characteristics of the accelerometer. The loosely confined material within the element will tend to respond "in bulk" or as a whole to the low frequency acceleration. During this basic response, however, the loosely confined material is capable of relatively quicker response to variations in accelerations, such as the additive and subtractive variations of secondary vibrations. The individual loose particles will move about within the chamber under the influence of the high-frequency or secondary accelerations and in so doing will develop frictional forces in opposition to the high-frequency forcing condition.

The damping forces developed by the "flow" of loose material in response to rate of change in acceleration may be further illustrated by comparison with the well-known fact that a sack of sand dropped on a hard surface will not bounce, whereas a comparable single block of stone will bounce. Both the sack of sand and the solid stone, however, would respond identically when freely falling under the acceleration due to gravity. This could be extended to a closer example by suspending both the sand and stone to strings to form two pendulums. These pendulums would exhibit the same apparent characteristics when freely swinging. If, however, a solid wall were suddenly introduced in the paths of the pendulums, the stone pendulum would rebound while the sand one would have little or no tendency to rebound.

The degree and characteristics of the internal damping depend upon the nature of the confined loose material, the nature of the confining chamber, the distribution of the loose material within the confining chamber, and the percentage of total effective accelerometer sensitive mass represented by the loose material. It is possible that accelerometers designed for certain applications may require no damping other than that which can be produced as internal damping. On the other hand, if the internal damping possible to provide should be insufficient, any degree of internal damping that can be obtained will make a corresponding reduction in the damping which must be supplied by external means. Since external damping is subject to variations and other disadvantages before enumerated, any reduction in the external damping which may be effected through the use of fixed internal damping will be proportionately reflected in a reduction in the complications due to and possible variations produced by the entire damping system.

In Fig. 2, I have illustrated a modified form of my invention in which the acceleration responsive member comprises a shell 10 which is divided into upper and lower compartments by a transverse barrier 11. A plurality of mass particles 12 is then placed in each of the compartments to provide the internal damping. The acceleration responsive member 10, which is normally maintained in a neutral position by springs 13—13' will be caused to move either in the direction of the solid arrow or that of the broken arrow, dependent, of course, upon the direction of the forcing acceleration to which the instrument is subjected.

The embodiment of my invention as illustrated in Fig. 3 is similar in operation to that illustrated in Fig. 2 except that it is responsive to linear accelerations in one direction only. Also, instead of the two-compartment construction, the shell member 10a is divided into four compartments by horizontal and vertical barriers 11a—11b respectively, each of which contains a single pellet 12a.

In Fig. 4 my invention is illustrated as applied to a linear type classifying accelerometer. In general, in this type of accelerometer, the acceleration responsive element 14, which contains mass particles 15 and which is positioned at one end of a cantilever member 16, is biased with a force $f$ against a contact 17. When the forces of acceleration to which acceleration responsive member 14 is subjected exceed the force $f$, member 14 will break contact with member 17 and substantially simultaneously make contact with an oppositely disposed contact member 18 in accordance with the equation, force=mass×acceleration. This instrument may be connected by conductors 19 to any suitable type of detecting means.

In Fig. 5 I have illustrated by invention as applied to a displacement type of accelerometer for indicating angular acceleration to which the instrument is subjected. The acceleration responsive element therein may comprises a bar 20 which is pivoted centrally thereof and held in a normally balanced position relative to said pivot by means of springs 21, which are constructed similarly to each other so that the pointer 22 will be in the position as illustrated under conditions of zero angular acceleration.

Like chambers are formed in member 20 and each contains loosely confined mass particles 23. When the instrument is subjected to an angular acceleration in a clockwise direction, the forcing acceleration will cause members 20 and 22 to move in a counterclockwise direction. Conversely, when the instrument is subjected to an angular acceleration in a counterclockwise direction, acceleration responsive member 20 and pointer 22 will be caused to move in a clockwise direction.

In Fig. 6 I have illustrated my invention as being applied to a displacement type angular accelerometer which is suitable for measuring angular acceleration in one direction only. A spring 24 is the source of a variable torque on the centrally pivoted acceleration responsive element 25 containing mass particles 26 in each end thereof, which torque under conditions of zero acceleration biases element 25 into contact with abutment 27 and the pointer 28 likewise indicates zero acceleration. When the instrument is subjected to suitably oriented angular acceleration, the torque developed thereby will cause member 25 and pointer 28 to move in a counter direction against the opposing torque induced by spring member 24.

In Fig. 7 I have illustrated my invention as applied to a classifying accelerometer for measuring angular accelerations. In this embodiment the acceleration responsive mass consists of a pair of hollow members 29—29' mounted on a bar 30, each of the shells containing a plurality of self-damping mass particles 31. The bar 30 is pivoted centrally and the mass system is rotationally biased with a torque against contact 32 by the action of spring 33. When the torque produced by angular acceleration to which the instrument is subjected exceeds the torque of spring 33, the mass element will be caused to rotate about pivot 34 in a clockwise direction, breaking contact with member 32 and substantially simultaneously making contact with an oppositely disposed contact member 35. As with the device illustrated in Fig. 4, the instrument in Fig. 7 may be connected as by conductors 36 for operation in conjunction with suitable means for detecting a break contact with member 32 or a make contact with member 35.

The internal damping action resulting from the freely movable masses in the embodiments illustrated in Figs. 2—7 is developed in the same manner as that described herein with respect to the operation of the device shown in Fig. 1.

It will be evident that various changes and modifications may be made in my invention without departing from the spirit and scope thereof, and accordingly I desire it to be understood that only such limitations as are necessitated by the prior art shall be made upon the claims appended hereto. In general, I prefer to use a freely movable solid mass, and in particular powdered tungsten to provide an internal self-damping acceleration responsive mass. It will be evident, however, that under certain circumstances it may be advantageous to use some other free mass material, a liquid such as mercury, for example.

The invention described herein may be manufactured and used by or for the Government of the United States of America for governmental purposes without the payment of any royalties thereon or therefor.

Having thus set forth the foregoing disclosure, what I claim as my invention is:

1. A device adapted for use in ascertaining acceleration imparted thereto, said device including an element movable in response to acceleration comprising a multi-compartment shell, each said compartment containing a mass free to move therein to develop internal damping.

2. An accelerometer comprising a body member, an acceleration responsive member including a cavity therein containing mass movable within said cavity to develop internal damping, said acceleration responsive member being supported for movement thereof relative to said body member, and yieldable means biasing said acceleration responsive member to a rest position from which it is movable in accordance with accelerations imposed upon said accelerometer.

3. The combination in claim 2, wherein said movable mass comprises a plurality of mass particles.

4. The combination in claim 2, wherein said movable mass comprises powdered heavy metal.

5. An accelerometer for use in ascertaining linear accelerations comprising a body member, an acceleration responsive member including a cavity therein containing mass movable within said cavity to develop internal damping, means for mounting said acceleration responsive member on said body member to permit movement thereof relative to linear movement of said body member, and yieldable means biasing said acceleration responsive member to a rest position from which it is movable in accordance with linear accelerations imposed upon said accelerometer.

6. An accelerometer for use in ascertaining angular accelerations comprising a body member, an acceleration responsive member, pivot means for mounting said acceleration responsive member on said body member to permit rotation thereof on an axis through its center relative to angular motion of said body member, said acceleration responsive member being provided with a cavity therein containing mass movable within said cavity to develop internal damping, and yieldable means biasing said acceleration responsive member to a rest position from which it is movable in accordance with angular accelerations imposed upon said accelerometer.

JAMES A. BUCHANAN.